US012402237B2

(12) United States Patent
Wei et al.

(10) Patent No.: US 12,402,237 B2
(45) Date of Patent: Aug. 26, 2025

(54) TRANSVERSE WAVE EXCITATION PLASMA ARRAY GENERATORS

(71) Applicant: CHINA ACADEMY OF AEROSPACE AERODYNAMICS, Beijing (CN)

(72) Inventors: Wei Wei, Beijing (CN); Fengling Guo, Beijing (CN); Hui Yang, Beijing (CN)

(73) Assignee: CHINA ACADEMY OF AEROSPACE AERODYNAMICS, Beijing (CN)

( * ) Notice: Subject to any disclaimer, the term of this patent is extended or adjusted under 35 U.S.C. 154(b) by 0 days.

(21) Appl. No.: 18/434,794

(22) Filed: Feb. 6, 2024

(65) Prior Publication Data

US 2025/0024581 A1 Jan. 16, 2025

Related U.S. Application Data

(63) Continuation-in-part of application No. PCT/CN2022/072331, filed on Jan. 17, 2022.

(51) Int. Cl.
*H05H 1/46* (2006.01)

(52) U.S. Cl.
CPC .......... *H05H 1/466* (2021.05); *H05H 1/4652* (2021.05)

(58) Field of Classification Search
None
See application file for complete search history.

(56) References Cited

U.S. PATENT DOCUMENTS 2,063,947 A * 12/1936 Pierce .................... G01S 3/805 318/118
3,932,039 A * 1/1976 Frey ...................... G01D 5/345 356/138

(Continued)

FOREIGN PATENT DOCUMENTS

CA 2713939 C * 12/2017 .............. A61N 7/00
CN 102114910 A 7/2011

(Continued)

OTHER PUBLICATIONS

International Search Report in PCT/CN2022/072331 mailed on Jul. 1, 2022, 9 pages.

(Continued)

*Primary Examiner* — Srinivas Sathiraju
(74) *Attorney, Agent, or Firm* — Porus IP LLC

(57) ABSTRACT

A transverse wave excitation plasma array generator is provided, comprising a plasma array controller and a controlled profile. The plasma array controller includes a plurality of plasma generators, and the plasma array controller is mounted on the controlled profile. The plasma array controller is configured to: control the plurality of plasma generators to generate high-frequency jets under an excitation of high-frequency electricity, obtain spatially distributed high-frequency transverse waves, and generate, based on the high-frequency transverse waves, high-frequency excitation for controlling a second mode of a boundary layer of the controlled profile to promote transition of the boundary layer of the controlled profile, improving a boundary of a frequency domain of plasma flow control. Besides, each of the plurality of plasma generators is connected in series with a plurality of capacitor units and the plurality of inductive coils to form a multi-level array loop. A lower array loop is connected with the inductive coil of a higher array loop to form a loop module. A plurality of the loop modules are (Continued)

connected in series to form a loop module group. A plurality of the loop module groups are connected in parallel to form the plasma array controller.

16 Claims, 7 Drawing Sheets

(56) References Cited

U.S. PATENT DOCUMENTS 5,369,511 A * 11/1994 Amos .................. G02B 19/009 359/107
8,579,835 B2 * 11/2013 Britva ...................... A61N 7/00 601/2
8,726,734 B1 * 5/2014 Lin ....................... B06B 1/0622 73/626
10,959,703 B2 * 3/2021 Hollender .......... G01N 29/0654
11,205,410 B2 * 12/2021 Kim ..................... G10K 11/172
11,255,663 B2 * 2/2022 Binder .................... G01S 15/08
11,327,163 B2 * 5/2022 Palmeri ............... G01S 7/52026
11,612,381 B2 * 3/2023 Crocco ................ A61B 8/5223 600/438
11,633,175 B2 * 4/2023 Questa ................... A61B 8/461 600/438
11,906,290 B2 * 2/2024 Binder ................. G01B 11/026
2003/0214199 A1 * 11/2003 Heim ....................... H04R 5/02 310/309
2004/0194547 A1 * 10/2004 Tozaki ................... G01N 29/12 73/579
2010/0052686 A1 * 3/2010 Park ..................... G01V 11/007 324/332
2010/0301398 A1 * 12/2010 Rothberg ........... G01N 27/4145 257/253
2011/0213279 A1 * 9/2011 Britva ...................... A61N 7/00 601/2
2012/0261274 A1 * 10/2012 Rearick .............. G01N 27/4145 205/789
2012/0265474 A1 * 10/2012 Rearick .................. G16B 30/00 702/104
2012/0302820 A1 * 11/2012 Carmeli ............... A61B 5/0538 600/12
2013/0231870 A1 * 9/2013 Sugnet ................... G16B 40/00 702/19
2014/0093881 A1 * 4/2014 Sugnet .................... H03M 7/30 435/6.12
2014/0113828 A1 * 4/2014 Gilbert ................... G01K 7/006 252/500
2015/0249341 A1 * 9/2015 Kapcia .................... H02J 50/12 307/104
2015/0303895 A1 * 10/2015 Ballandras ............. H10N 30/40 310/313 R
2016/0032906 A1 * 2/2016 Leskosek .............. F03H 1/0006 60/203.1
2017/0232122 A1 * 8/2017 Hancock ................... A61L 2/14 604/23
2018/0296189 A1 * 10/2018 Hollender .............. G01N 29/07
2018/0374466 A1 * 12/2018 Kim ..................... G10K 11/162
2019/0041506 A1 * 2/2019 Palmeri ............... G01S 7/52036
2019/0154439 A1 * 5/2019 Binder .................... G01S 15/42
2019/0328364 A1 * 10/2019 Questa ................... A61B 8/485
2019/0350559 A1 * 11/2019 Bini ........................ A61B 8/485
2020/0094066 A1 * 3/2020 Heath .................. A61N 5/0616
2021/0022710 A1 * 1/2021 Crocco ............... G01S 15/8915
2021/0359660 A1 * 11/2021 Tanno .................. H03H 9/6483
2022/0104794 A1 * 4/2022 De Beni .............. A61B 8/5253
2022/0128352 A1 * 4/2022 Binder .................. G01S 13/878
2024/0159522 A1 * 5/2024 Binder .................... G01S 15/42
2024/0175678 A1 * 5/2024 Binder ................... G01B 15/00
2025/0024581 A1 * 1/2025 Wei .......................... H05H 1/46

FOREIGN PATENT DOCUMENTS

CN 107238481 A 10/2017
CN 110131072 A 8/2019
CN 110920869 A 3/2020
CN 111520352 A 8/2020
CN 112594011 A 4/2021
CN 114364115 B 10/2023
IL 207343 A * 6/2016 ............... A61N 7/00

OTHER PUBLICATIONS

Written Opinion in PCT/CN2022/072331 mailed on Jul. 1, 2022, 7 pages.
International Search Report in PCT/CN2022/072331 mailed on Jul. 1, 2022, 7 pages.
Written Opinion in PCT/CN2022/072331 mailed on Jul. 1, 2022, 5 pages.

* cited by examiner

TRANSVERSE WAVE EXCITATION PLASMA ARRAY GENERATORS

CROSS-REFERENCE TO RELATED APPLICATIONS

This application is a Continuation-in-Part of the International Patent Application No. PCT/CN 2022/072331, filed on Jan. 17, 2022, the entire contents of which are hereby incorporated by reference.

TECHNICAL FIELD

The present disclosure relates to the technical field of plasma, and in particular to a transverse wave excitation plasma array generator.

BACKGROUND

The flow state of a boundary layer has a significant influence on the heat flow and friction resistance of an aircraft surface. In high-speed aircrafts, there may be a dynamic coupling phenomenon between a transition state and an aircraft motion/control, impacting the flight stability of the aircraft. Therefore, the control of flow transition is one of the key issues in the development of high-speed aircrafts. There are multiple factors affecting transition, including incoming flow conditions, surface roughness, the structural form of a transition zone, etc. The form of the transition is also categorized as natural transition, forced transition, etc., especially regarding the excitation/control of a second mode (a main frequency being approximately 50 kHz) of the boundary layer.

At present, flow transition is often controlled using passive control structures (e.g., a vortex generator, etc.). However, this approach cannot cover a relatively wide flight envelope of high-speed aircrafts, and can only select limited operating conditions (i.e., an operating state of a device) for flow control. Other flow transition control structures (e.g., blowing and suction systems, diaphragm and piezoelectric synthetic jet generators, etc.) often fail to adequately meet the control needs of the second mode of the boundary layer for high-speed aircrafts due to a frequency, an intensity, a power, an angle, or other factors, resulting in a reduced flow control boundary.

Therefore, it is desirable to provide a transverse wave excitation plasma array generator to improve the boundary of plasma flow control.

SUMMARY

One of the embodiments of the present disclosure provides a transverse wave excitation plasma array generator, comprising a plasma array controller and a controlled profile. The plasma array controller may include a plurality of plasma generators. The plasma array controller may be mounted on the controlled profile. The plasma array controller may be configured to: control the plurality of plasma generators to generate high-frequency jets under an excitation of high-frequency electricity, obtain spatially distributed high-frequency transverse waves, and generate, based on the high-frequency transverse waves, high-frequency excitation for controlling a second mode of a boundary layer of the controlled profile to promote transition of the boundary layer of the controlled profile. The plasma array controller may further include a capacitor and an inductor. The capacitor may include a plurality of capacitor units. The inductor may include a plurality of inductive coils. Each of the plurality of plasma generators may be connected in series with the plurality of capacitor units and the plurality of inductive coils to form a multi-level array loop. An input end of a lower array loop may be connected with an output end of the inductive coil of a higher array loop to form a loop module. A plurality of the loop modules may be connected in series to form a loop module group. A plurality of the loop module groups may be connected in parallel to form the plasma array controller.

In some embodiments, the plurality of the plasma generators may be connected with the capacitor and the inductor to form an inductance-capacitance resonance circuit. The inductance-capacitance resonance circuit may be set at a predetermined loop position.

In some embodiments, each of the plurality of plasma generators may include a cavity and electrodes disposed at two sides of the cavity. The electrodes may generate, based on the high-frequency electricity, the high-frequency jets.

In some embodiments, a material of the cavity may include a ceramic, and a material of the electrodes may include tungsten.

In some embodiments, a ratio of a diameter of each of the electrodes to an inner diameter of the cavity may be within a range of 0.05-0.08.

In some embodiments, a frequency of the high-frequency electricity may be within a range of 1 KHz-3 KHZ, and a voltage of the high-frequency electricity may be within a range of 1 KV-10 KV.

In some embodiments, a ratio of a spacing of the plurality of plasma generators in an X-direction to a spacing of the plurality of plasma generators in a Z-direction may be within a range of 0.8-1.2.

In some embodiments, output characteristics of the plurality of plasma generators may satisfy a predetermined output relationship expressed as:

$$Y=F(\omega,t,\tau,\varphi)$$

wherein Y denotes the output characteristics of the plurality of plasma generators, ω denotes a jet frequency of the plurality of plasma generators, t denotes a time sequence of the plurality of plasma generators generating the high-frequency jets, τdenotes a spatial distribution delay matrix of the transverse wave excitation plasma array generator, and φ denotes a spatial distribution phase matrix of the transverse wave excitation plasma array generator.

In some embodiments, one or more gas pressure sensors may be provided within a predetermined range where the boundary layer of the controlled profile is located. The plasma array controller may be further configured to obtain a gas pressure sequence detected by the one or more gas pressure sensors, and determine, based on a distance between the gas pressure sequence and a predetermined gas pressure sequence, an emission parameter of the plurality of plasma generators. The emission parameter may include an arrangement of the plurality of plasma generators.

In some embodiments, the emission parameter may further include a time delay and a phase of the high-frequency jets output from the plurality of plasma generators. The plasma array controller may be further configured to predict, based on a predetermined high-frequency transverse wave feature, the time delay and the phase of the high-frequency jets output from the plurality of plasma generators through an emission prediction model, the emission prediction model being a machine learning model; and determine the arrangement of the plurality of plasma generators based on the time delay and the phase of the high-frequency jets.

In some embodiments, a count and an arrangement of the one or more gas pressure sensors may be related to a type of transition, and a demand degree of transition of the boundary layer.

BRIEF DESCRIPTION OF THE DRAWINGS

The present disclosure will be further illustrated by way of exemplary embodiments, which will be described in detail with reference to the accompanying drawings. These embodiments are not limiting. In these embodiments, the same numbering indicates the same structure, wherein.

REFERENCE SIGNS

Figure 1:
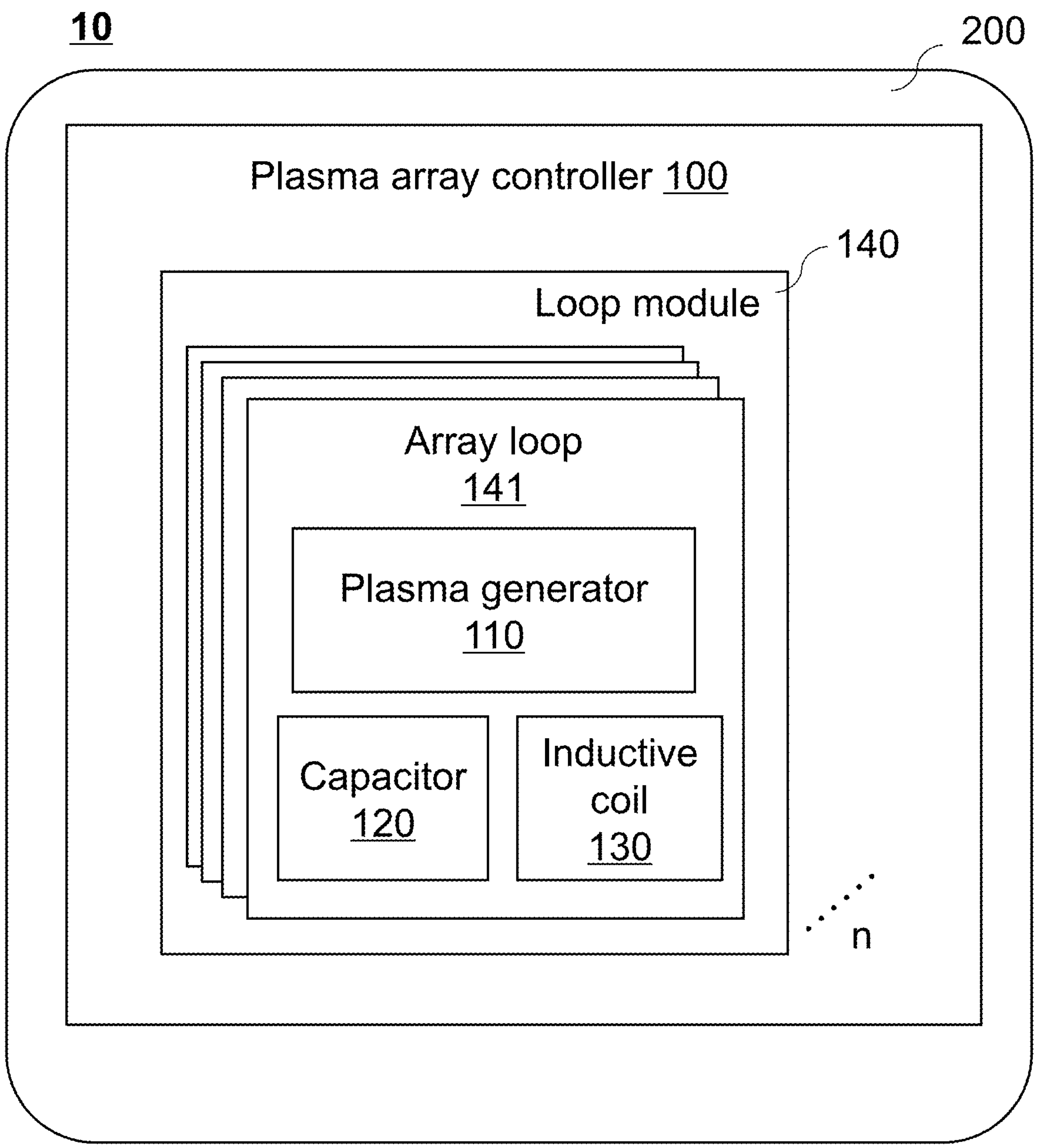
FIG. 1 is a schematic structural diagram illustrating a transverse wave excitation plasma array generator according to some embodiments of the present disclosure.

10: Transverse wave excitation plasma array generator, 100: plasma array controller, 110: plasma generator, 111: cavity, 112: electrode, 120: capacitor, 130: inductive coil, 140: loop module, 141: array loop, 114-1: first array loop, 114-2: second array loop, 150: loop module, 200: controlled profile, 710: gas pressure sequence, 720: predetermined gas pressure sequence, 730: arrangement, 740: high-frequency transverse wave feature, 750: emission prediction model, and 760: time delay and phase of high-frequency jets.

DETAILED DESCRIPTION

In order to more clearly illustrate the technical solutions of the embodiments of the present disclosure, the following briefly introduces the drawings that need to be used in the description of the embodiments. Apparently, the accompanying drawings in the following description are only some examples or embodiments of the present disclosure, and those skilled in the art can also apply the present disclosure to other similar scenarios according to the drawings without creative efforts. Unless obviously obtained from the context or the context illustrates otherwise, the same numeral in the drawings refers to the same structure or operation.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an" and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowchart is used in the present disclosure to illustrate the operations performed by the system according to the embodiments of the present disclosure. It should be understood that the preceding or following operations are not necessarily performed in the exact order. Instead, various steps may be processed in reverse order or simultaneously. Meanwhile, other operations may be added to these procedures, or a certain step or steps may be removed from these procedures.

Regarding how to control flow transition, passive control structures (e.g., vortex generators, etc.) or other flow transition control structures (e.g., a blowing/suction system, diaphragm and piezoelectric synthetic jet generators, etc.) may be adopted in the prior art. These structures may transition a fluid from a laminar state to a turbulent state when encountering a head-on fluid, thereby facilitating the process of flow transition.

Merely by way of example, the vortex generator in the prior art is generally arranged on a surface of a wing or a flap to generate a flow vortex, enhancing mixing of main flow and boundary layer flow to achieve the purpose of suppressing separation. However, vortex generator may not improve performance under different flight operating conditions. The blowing/suction system in the prior art may inject energy into the boundary layer by adding an external air source, but an equipment size and power consumption of the blowing/suction system are too large. The diaphragm and piezoelectric synthetic jet generators in the prior art generate low-energy high-frequency jets with relatively low jet velocities. A flow transition effect produced by the diaphragm and piezoelectric synthetic jet generators is still insufficient to meet practical standards, which leads to few applications in high-speed flows. A piston synthetic jet generator in the prior art may achieve a relatively high energy output. Due to a structural limitation of the piston synthetic jet generator, a jet frequency of the piston synthetic jet generator cannot reach a relatively high level.

To sum up, the control requirements of a high-speed aircraft for a second mode of a boundary layer are difficult to satisfy in the prior art with respect to factors such as operating condition coverage, frequency, intensity, power, etc.

The present disclosure provides a transverse wave excitation plasma array generator. The transverse wave excitation plasma array generator may promote forced transition by generating high-frequency transverse waves and controlling the high-frequency transverse waves to resonate with the second mode of the boundary layer. In addition, the transverse wave excitation plasma array generator may also adjust the high-frequency transverse waves in real time based on a flight state of the aircraft to satisfy the control requirements of the second mode of the boundary layer. Furthermore, the high-frequency transverse waves generated by the transverse wave excitation plasma array generator may be superimposed and combined along a flow direction, resulting in frequency modulation and intensity adjustment of the flow direction, thereby widening the boundary of flow control.

It should be understood that the application scenarios of the transverse wave excitation plasma array generator of the present disclosure are only some examples or embodiments of the present disclosure, and those having ordinary skills in the art, without creative efforts, may apply the present disclosure to other similar scenarios in accordance with these drawings.

The transverse wave excitation plasma array generator will be illustrated in detail according to the embodiments of the present disclosure with reference to FIGS. 1-7. It should be noted that the following embodiments are intended only to explain the present disclosure and do not constitute a limitation of the present disclosure.

FIG. 1 is a schematic structural diagram illustrating a transverse wave excitation plasma array generator according to some embodiments of the present disclosure. In some embodiments, as illustrated in FIG. 1, a transverse wave excitation plasma array generator 10 may include a plasma array controller 100 and a controlled profile 200. The plasma array controller 100 may be mounted on the controlled profile 200.

The plasma array controller 100 refers to an electronic device that performs transition control. In some embodiments, the plasma array controller 100 may be configured to control a plurality of plasma generators 110 to generate high-frequency jets under an excitation of high-frequency electricity to obtain spatially distributed high-frequency transverse waves. The plasma array controller 100 may generate a high-frequency excitation for controlling a second mode of a boundary layer of a controlled profile based on the high-frequency transverse waves to promote transition of the boundary layer of the controlled profile 200.

The high-frequency electricity refers to a power supply provided to the plasma generator 110 for operation. In some embodiments, the plurality of plasma generators 110 may generate the corresponding high-frequency jets based on the high-frequency electricity. Correspondingly, the plurality of plasma generators 110 may be arranged on the controlled profile 200. An arrangement of the plurality of plasma generators 110 may cause the high-frequency jets generated by the plurality of the plasma generators 110 to combine with each other to form the high-frequency transverse waves. More descriptions regarding the plurality of plasma generators 110 may be found in FIG. 2 and related descriptions thereof. More descriptions regarding the arrangement may be found in FIG. 7 and related descriptions thereof.

In some embodiments, a frequency of the high-frequency electricity may be within a predetermined frequency range, and a voltage of the high-frequency electricity may be within a predetermined voltage range. In some embodiments, the predetermined frequency range and the predetermined voltage range may be set based on manual historical experience or a demand of transition. For example, when an aircraft needs to accelerate, and the demand of transition is to accelerate a transition speed, the transverse wave excitation plasma array generator 10 may set a relatively high predetermined frequency range of the frequency and a relatively high predetermined voltage range of the voltage, so that the plurality of plasma generators 110 may generate corresponding high-frequency transverse waves to accelerate the transition of the boundary layer. Merely by way of example, the predetermined frequency range may be within a range of 1 kHz-3 kHz, and the predetermined voltage range may be within a range of 1 kV-10 kV.

In the present disclosure, by designing the frequency of the high-frequency electricity to be within a range of 1 kHz-3 kHz and the voltage of the high-frequency electricity to be within a range of 1 kV-10 kV, the plurality of plasma generators 110 may be controlled to generate a high-frequency transverse flow, thereby achieving frequency modulation and intensity adjustment of the high-frequency transverse flow in a flow direction, and widening the boundary of flow control.

The high-frequency jets refer to a flow of fluid carrying ions in a high-frequency range. In some embodiments, the plurality of plasma generators 110 may inject an energy into atoms and molecules under the high-frequency electricity, converting the atoms and the molecules into ions to generating the high-frequency jets. In some embodiments, a frequency of the high-frequency jets may be related to the frequency of the high-frequency electricity. For example, the higher the frequency of the high-frequency electricity, the higher the frequency of the generated high-frequency jets. In some embodiments, the frequency of the high-frequency jets may be set within a frequency range in various ways based on manual experience or control requirements. Merely by way of example, the frequency of the high-frequency jets may be within a predetermined jet frequency range. The predetermined jet frequency range may be within a range of 1 kHz-3 kHz.

The high-frequency transverse waves refer to electromagnetic waves in the high-frequency range where a vibration direction of the ions is perpendicular to an advance direction of the ions. When the high-frequency transverse waves propagate in the flow field, the high-frequency transverse waves interact with a gas in a flow field and generate a certain perturbation. When the high-frequency transverse waves interact with gas molecules, the high-frequency transverse waves generate a certain amount of momentum transfer and heat transfer, which alters kinetic energy and thermodynamic states of the gas molecules, causing the gas molecules to move and vibrate. The movement and the vibration may further perturb surrounding gas molecules, causing a chain reaction, and ultimately causing a perturbation in the flow field to achieve transition.

The transition refers to a process of a fluid transitioning from a laminar flow state to a turbulent flow state. In fluid dynamics, a motion state of the fluid may be classified into the laminar flow state and the turbulent flow state. In the laminar flow state, the fluid in a pipe or another container is orderly arranged, with a flow velocity uniformly distributed along a flow channel, presenting laminar flow characteristics. In the turbulent flow state, the motion state of the fluid becomes complex and disordered, with an irregular distribution and magnitude of the flow velocity throughout the flow channel, presenting turbulent flow characteristics.

The boundary layer refers to a fluid boundary layer that attaches to surface of a solid when the fluid flows along the surface of the solid or when the solid moves in the fluid. For example, taking the air as an example, when the air flows over an object, a surface of the object is not perfectly smooth, and the air has viscosity, which causes a layer of air close to the surface of the object to encounter resistance during flowing, causing the flow velocity to reduce to zero and causing the flow velocity of an upper layer of air to reduce. As a result, a thin layer of air, referred to as the boundary layer, where the flow velocity gradually increases along a normal direction to the surface of the object, may be generated close to the surface of the object.

The second mode refers to an inherent vibration characteristic of the boundary layer with a predetermined inherent frequency. In some embodiments, the predetermined inherent frequency may be determined based on a parameter and a morphology of the boundary layer. For example, the predetermined inherent frequency may include a main frequency of approximately 50 kHz. In some embodiments, when the second mode of the boundary layer is subjected to the high-frequency excitation, the boundary layer of the controlled profile 200 may transition from the laminar flow state to the turbulent flow state, thereby actively achieving the forced transition of the boundary layer.

The high-frequency excitation refers to an excitation process of providing an energy in the high-frequency range to a substance and causing the substance to undergo a transformation. In some embodiments, the high-frequency transverse waves may interact with the fluid in the boundary layer, so that the second mode of the boundary layer may be subjected to the energy provided by the high-frequency transverse waves, and thus the fluid in the boundary layer may transition from the laminar flow state to the turbulent flow state, achieving the transition of the boundary layer.

In some embodiments, the plasma array controller may include the plurality of plasma generators 110 to generate the spatially distributed high-frequency transverse waves.

The plurality of plasma generators 110 refer to electronic devices that generate a large number of positive or negative ions. In some embodiments, each of the plurality of plasma generators 110 may generate the high-frequency jets on the boundary layer of the controlled profile 200 under the high-frequency electricity. Correspondingly, a combination of the plurality of plasma generators 110 may generate the spatially distributed high-frequency transverse waves on the boundary layer of the controlled profile 200.

The spatial distribution refers to a distribution state of the plurality of plasma generators 110 within a space of the boundary layer of the controlled profile 200. In some embodiments, the spatial distribution may include one or more distributions of a spaced distribution, a tiled distribution, a layered distribution, or the like. The spaced distribution means that the plurality of the plasma generators 110 are arranged apart at a predetermined distance. The tiled distribution means that the plurality of the plasma generators 110 are distributed on a plane where the controlled profile 200 is located. The layered distribution means that at least two plasma generators of the plurality of the plasma generators 110 are present in an overlapping distribution within the space of the boundary layer of the controlled profile 200.

Figure 2:
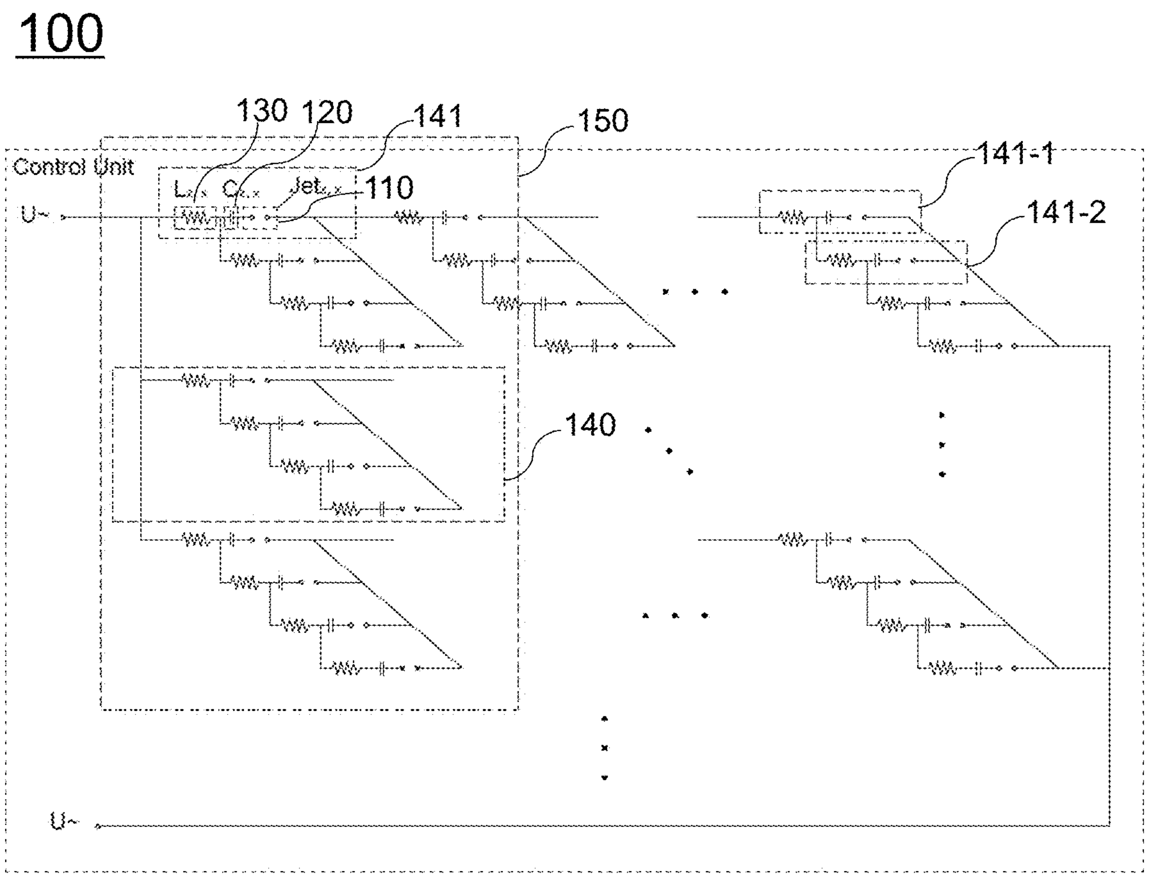
FIG. 2 is a schematic structural diagram illustrating a circuit of a plasma array controller according to some embodiments of the present disclosure.

FIG. 2 is a schematic structural diagram illustrating a circuit of a plasma array controller according to some embodiments of the present disclosure. In some embodiments, a capacitor may include a plurality of capacitors 120, and an inductor may include a plurality of inductive coils 130. Each of the plurality of plasma generators 110 may be connected in series with the plurality of capacitor units 120 and the plurality of inductive coils 130 to form a multi-level array loop 141. An input end of a lower array loop 141-2 may be connected with an output end of the inductive coil 130 of a higher array loop 141-1 to form a loop module 140. A plurality of the loop modules 140 may be connected in series to form a loop module group 150. A plurality of the loop module groups 150 may be connected in parallel to form the plasma array controller 100.

As illustrated in FIG. 2, each of the multi-level array loop 141 may include an inductive coil $L_{z,x}$, a capacitor unit $C_{z,x}$, and a plasma generator $Jet_{z,x}$ connected in series in sequence. The plasma generator $Jet_{z,x}$ may be controlled by the capacitor unit $C_{z,x}$ and the inductive coil $L_{z,x}$ to output corresponding high-frequency jets.

As illustrated in FIG. 2, the input end of the lower array loop 141-2 may be connected with the output end (i.e., a connection point between the capacitor $C_{z,x}$ and the inductive coil $L_{z,x}$) of the inductive coil 130 of the higher array loop 141-1, so that the lower array loop 141-2 and the higher array loop 141-1 may form the loop module group 150.

As illustrated in FIG. 2, in a series connection of the plurality of loop modules 140, an input end of the inductive coil $L_{z,x}$ in a first array loop 141 of a next loop module 140 may be connected with an output end of the plasma generator 110 of a previous loop module 140 to form the loop module group 150 in the series connection.

As illustrated in FIG. 2, in a parallel connection of the plurality of loop module groups 150, input ends of the plurality of inductive coil $L_{z,x}$ in the first array loop 141 of each of the plurality of loop module groups 150 may be connected, and output ends of the plurality of plasma generators in a last array loop 141 of each of the plurality of loop module groups 150 may be connected. The connected input ends and the connected output ends may receive an excitation of the high-frequency electricity, respectively, to form the plasma array controller 100.

In some embodiments of the present disclosure, the multi-level array loop 141, the plurality of loop modules 140, and the plurality of loop module groups 150 may be provided to control each of the plurality of plasma generators 110 and separately drive the corresponding plasma generators 110 to output the high-frequency transverse flow, thereby improving the adjustability of the high-frequency transverse flow, and expanding the boundary of flow control.

Figure 3:
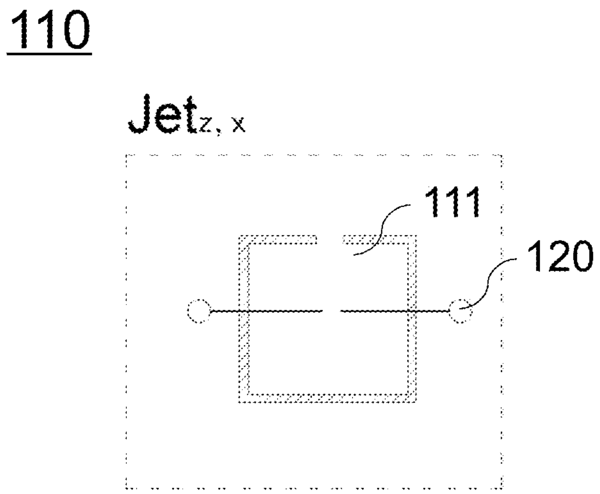
FIG. 3 is a schematic structural diagram illustrating a plurality of plasma generators according to some embodiments of the present disclosure.

FIG. 3 is a schematic structural diagram illustrating a plurality of plasma generators 110 according to some embodiments of the present disclosure. In some embodiments, as illustrated in FIG. 3, each of the plurality of plasma generators 110 (e.g., the plasma generator $Jet_{z,x}$ illustrated in FIG. 3) may include a cavity 111 and electrodes 112 disposed at two sides of the cavity 111. The electrodes 112 may generate, based on high-frequency electricity, high-frequency jets.

In some embodiments, the cavity 111 may provide a space required for generating the high-frequency jets. When an electric field is applied to the cavity 111, atoms and molecules within the cavity 111 are energized to be converted into ions. Correspondingly, an interior of the cavity 111 may form a plasma region. In some embodiments, the cavity 111 may also be provided with through holes to allow the ions to be ejected from the cavity 111, thereby generating the high-frequency jets.

In some embodiments, the electrodes 112 may apply the electric field to the cavity 111, under the high-frequency electricity, injecting an energy into the atoms and the molecules inside the cavity 111 to convert the atoms and the molecules into the ions, thereby generating the high-frequency jets. In some embodiments, the plasma array controller 100 may adjust the high-frequency electricity of the plurality of plasma generators 110 based on a flight state of an aircraft, thereby adjusting the high-frequency transverse waves in real time, and satisfying control requirements of a second mode of a boundary layer. For example, when the flight state is acceleration, the plasma array controller 100 may increase a voltage of the high-frequency electricity to generate relatively large high-frequency transverse waves, causing the boundary layer to quickly transition to avoid fluid impedance and facilitate acceleration of the aircraft.

In some embodiments, a material of the cavity 111 may include one or more insulating materials such as a ceramic, rubber, or plastic. In some embodiments, a material of the electrodes 112 may include one or more electrically conductive materials such as tungsten, copper, or silver. In some embodiments, a material of the cavity 111 may include a ceramic, and a material of the electrodes 112 may include tungsten.

In the embodiments of the present disclosure, the cavity 111, which is made of the ceramic, enhances the insulation of an environment where ions are generated, and the electrodes 112, which is made of the tungsten, ensures stable supply of the high-frequency electricity. This design can control steady generation of the high-frequency jets by the plurality of plasma generators 110 to satisfy the requirements of providing a high-frequency excitation to the second mode of the boundary layer, thereby achieving transition control.

In some embodiments, a ratio of a diameter of each of the electrodes 112 to an inner diameter of the cavity 111 may be within a predetermined diameter ratio range. In some embodiments, the predetermined diameter ratio range may be set based on manual experience or a demand of transition. For example, the ratio of the diameter of each of the electrodes 112 to the inner diameter of the cavity 111 may be within a range of 0.05-0.08. For example, the ratio of the diameter of each of the electrodes 112 to the inner diameter of the cavity 111 may be 0.05, 0.06, 0.08, or the like.

In the embodiments of the present disclosure, by setting the ratio of the diameter of each of the electrodes 112 to the inner diameter of the cavity 111 to be within the range of 0.05-0.08, the plurality of plasma generators may be controlled to generate the high-frequency jets that satisfy the demand of transition, thereby generating the high-frequency transverse waves to excite the second mode of the boundary layer and promote forced transition.

In the embodiments of the present disclosure, through the cooperation of the electrodes and the cavity, the plasma array controller 100 may adjust the high-frequency electricity applied to the plurality of plasma generator based on the flight state of the aircraft, thereby adjusting the high-frequency transverse waves in real time to satisfy the control requirements of the second mode of the boundary layer.

The controlled profile 200 refers to a surface of a device where the boundary layer is controlled, such as a two-dimensional inlet duct profile, a binary retracting and expanding nozzle runner profile, and other aircraft profiles. In some embodiments, the controlled profile 200 may be provided with the plasma array controller 100. The plasma array controller 100 may generate spatially distributed high-frequency transverse waves and cause the high-frequency transverse waves to resonate with the second mode of the boundary layer of the controlled profile 200 to promote the forced transition of the boundary layer of the controlled profile 200.

When a frequency of the high-frequency transverse waves is close to or equal to an inherent frequency of the second mode of the boundary layer of the controlled profiles 200, the high-frequency transverse waves and the second mode of the boundary layer of the controlled profiles 200 may resonate, thereby providing the high-frequency excitation for the second mode of the boundary layer.

Figure 4:
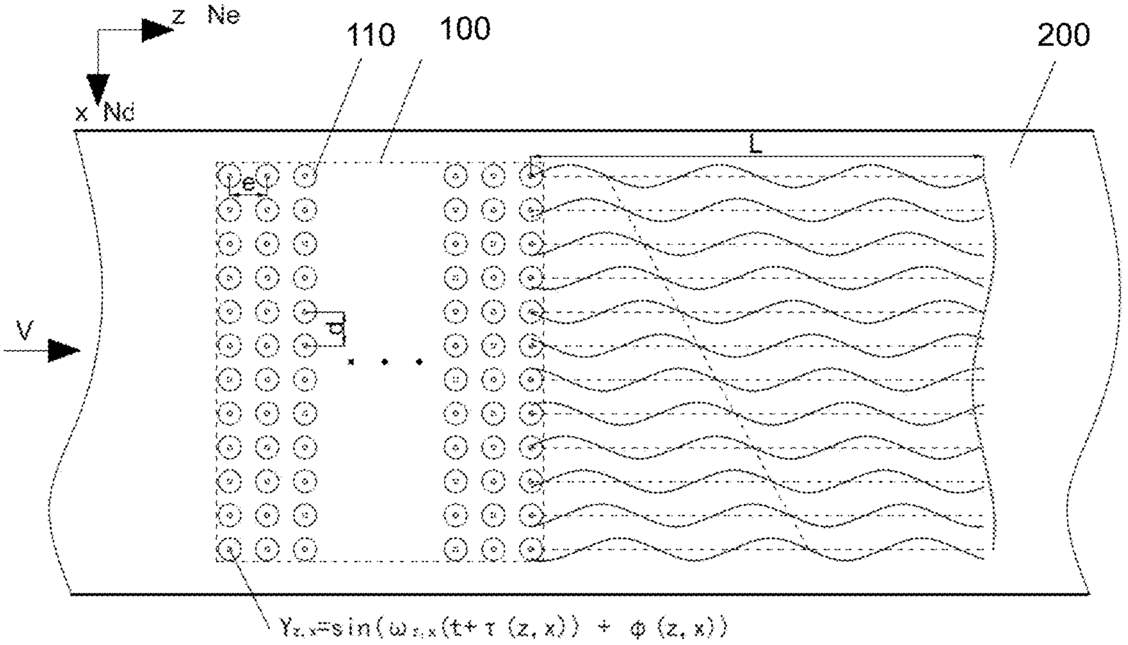
FIG. 4 is a schematic structural diagram illustrating a transverse wave excitation plasma array generator according to some embodiments of the present disclosure.

FIG. 4 is a schematic structural diagram illustrating the transverse wave excitation plasma array generator 10 according to some embodiments of the present disclosure. In some embodiments, as illustrated in FIG. 4, the plasma array controller 100 may be mounted on the controlled profiles 200. The plurality of the plasma generators 110 may be arranged in the plasma array controller 100 in a predetermined arrangement. In some embodiments, the arrangement may include parameters such as a position, a spacing, and a count of the plurality of the plasma generators 110. More descriptions regarding the arrangement may be found in FIG. 7 and related descriptions thereof.

For example, an X-direction as illustrated in FIG. 4 represents a transverse direction of the plasma array controller 100, and a Z-direction as illustrated in FIG. 4 represents a longitudinal direction of the plasma array controller 100. Nd plasma generators 110 may be provided in the X-direction of the plasma array controller 100, and Ne plasma generators 110 may be provided in the Z-direction of the plasma array controller 100.

As illustrated in FIG. 4, as illustrated in FIG. 4, a V-direction represents a direction of motion of high-frequency transverse waves generated by the plurality of plasma generators 110, and a length L represents a transmission length of the high-frequency transverse waves generated by the plurality of plasma generators 110. In some embodiments, position information of each of the plurality of plasma generators 110 may be represented using coordinates. As illustrated in FIG. 4, coordinate positions of the plurality of plasma generators 110 may be represented as (z, x).

In some embodiments, in the plasma array controller 100, a ratio of a spacing of the plurality of the plasma generators 110 in the X-direction to a spacing of the plurality of the plasma generators 110 in the Z-direction may be within a predetermined spacing range. As illustrated in FIG. 4, the spacing of the plurality of the plasma generators 110 in the transverse direction (i.e., the X-direction) may be denoted as d, and the spacing of the plurality of the plasma generators 110 in the longitudinal direction (i.e., the Z-direction) may be denoted as e, then the ratio of the spacing of the plurality of the plasma generators 110 in the X-direction to the spacing of the plurality of the plasma generators 110 in the Z-direction may denoted as d/e.

In some embodiments, the predetermined spacing range may be determined based on manual experience or the demand of transition. For example, the ratio d/e of the spacing d of the plurality of the plasma generators 110 in the transverse direction (i.e., the X-direction) to the spacing e of the plurality of the plasma generators 110 in the longitudinal direction (i.e., the Z-direction) may be within a range of 0.8-1.2. For example, the ratio d/e of the spacing d of the plurality of the plasma generators 110 in the transverse direction (i.e., the X-direction) to the spacing e of the plurality of the plasma generators 110 in the longitudinal direction (i.e., the Z-direction) may be 0.8, 1.0, 1.1, 1.2, or the like.

In some embodiments of the present disclosure, by designing the spacing of the plurality of the plasma generators 110 to be within the range of 0.8-1.2, the plurality of plasmas may emit the corresponding spatially distributed the high-frequency transverse waves, thereby achieving stable transition control.

In some embodiments, a ratio of a count of the plurality of the plasma generators distributed in the X-direction to a count of the plurality of the plasma generators distributed in the Z-direction may be within a predetermined count range. As illustrated in FIG. 4, the count of the plurality of plasma generators 110 distributed in the X-direction may be denoted as Nd, and the count of the plurality of plasma generators 110 distributed in the Z-direction may be denoted as Ne. The ratio of the count of the plurality of the plasma generators distributed in the X-direction to the count of the plurality of the plasma generators distributed in the Z-direction may be denoted as Nd/Ne.

In some embodiments, the predetermined count range may be determined based on manual experience or the demand of transition. For example, the ratio Nd/Ne of the count of the plurality of the plasma generators distributed in the X-direction to the count of the plurality of the plasma generators distributed in the Z-direction may be within a range of 0.8-1.2. For example, the ratio Nd/Ne of the count of the plurality of the plasma generators distributed in the X-direction to the count of the plurality of the plasma generators distributed in the Z-direction may be 0.8, 0.9, 1.2, or the like.

In some embodiments of the present disclosure, by designing the count of the plurality of the plasma generators 110 in the longitudinal and the transverse directions to be within the range of 0.8-1.2, the plurality of the plasma generators may be distributed on the controlled profile 200 in a tiled manner, thereby emitting the corresponding spatially distributed high-frequency transverse waves to achieve stable transition control.

In some embodiments, output characteristics of the plurality of plasma generators 110 may satisfy a predetermined output relationship. The predetermined output relationship may be expressed by equation (1):

$$Y = F(\omega, t, \tau, \varphi) \quad (1)$$

Wherein Y denotes the output characteristics of the plurality of plasma generators, ω denotes a jet frequency of the plurality of plasma generators, t denotes a time sequence of the plurality of plasma generators generating the high-frequency jets, τdenotes a spatial distribution delay matrix of the transverse wave excitation plasma array generator 10, and φ denotes a spatial distribution phase matrix of the transverse wave excitation plasma array generator 10.

The output characteristics of the plurality of plasma generators 110 refer to a characteristic relationship between a current and a voltage of plasma generation. The jet frequency refers to an angular frequency of the plurality of plasma generators 110 for outputting the high-frequency transverse waves. The time sequence refers to a combination of a plurality of time points at which the plurality of plasma generators 110 are required to generate the high-frequency jets. The spatially distributed delay matrix refers to a combination of output delay vectors between the plurality of the plasma generators 110. The spatial distribution phase matrix refers to a combination of output phase vectors between the plurality of the plasma generators 110.

For example, as illustrated in FIG. 4, output characteristics $Y_{z,x}$ of a plasma generator (z, x) may be represented by equation (2):

$$Y_{z,x} = \sin(\omega_{z,x}(t + \tau(z, x) + \varphi(z, x)) \quad (2)$$

Wherein $Y_{z,x}$ denotes the output characteristics of the plasma generator (z,x), (z,x) denotes the coordinate position of the plasma generator, $\omega_{z,x}$ denotes the jet frequency of the plasma generator (z,x), t denotes the time sequence of the plasma generator (z,x) generating the high-frequency jets, τ(z, x) denotes the spatial distribution delay matrix of the transverse wave excitation plasma array generator 10, and φ(z, x) denotes the spatial distribution phase matrix of the transverse wave excitation plasma array generator 10.

In some embodiments, under the excitation of the high-frequency electricity, the plasma array controller 100 may control the plurality of plasma generators 110 to generate the high-frequency jets to obtain the spatially distributed high-frequency transverse waves, and generate the high-frequency excitation for controlling the second mode of the boundary layer of the controlled profile 200 based on the high-frequency transverse waves, thereby promoting the transition of the boundary layer of the controlled profile 200.

Figure 5:
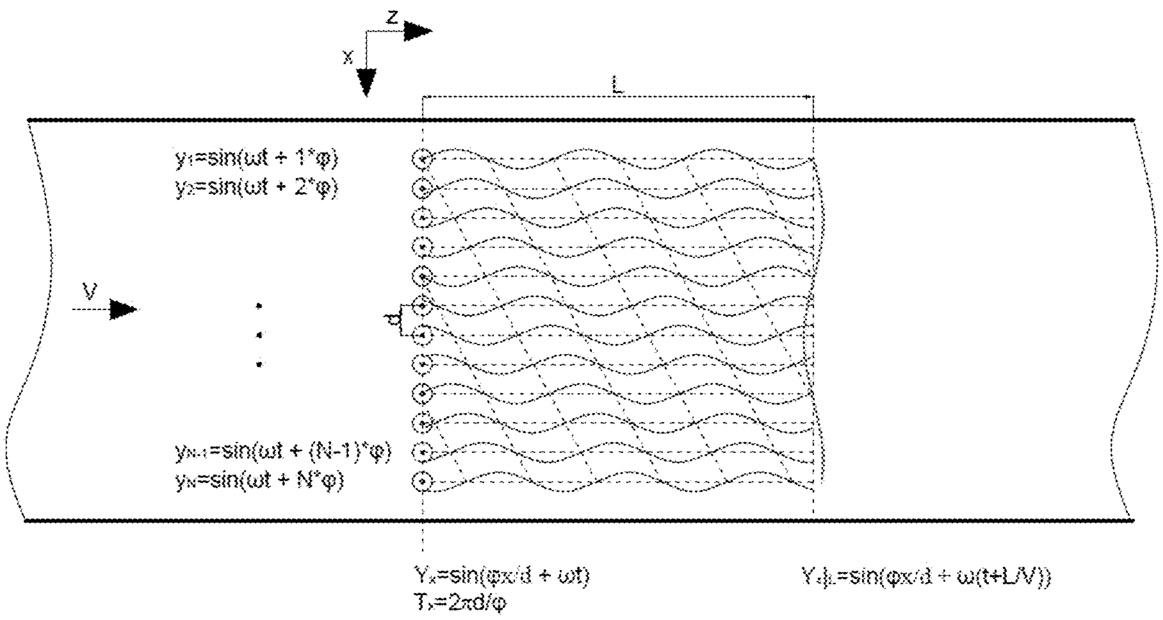
FIG. 5 is a schematic diagram illustrating a working principle of a transverse wave excitation plasma array generator according to some embodiments of the present disclosure.

FIG. 5 is a schematic diagram illustrating a working principle of a transverse wave excitation plasma array generator according to some embodiments of the present disclosure. As illustrated in FIG. 5, output characteristics of the N plasma generators 110 distributed in an X-direction may be $Y_1$=sin (ωt+1*φ), $Y_2$=sin (ωt+2*φ), . . . . $Y_N$=sin (ωt+N*φ), respectively. That is to say, high-frequency jets emitted by the plurality of the plasma generators 110 may be combined to form high-frequency transverse waves, so that the high-frequency transverse waves may resonate with a second mode of a boundary layer of the controlled profile 200, thereby promoting transition of the boundary layer of the controlled profile 200. More descriptions regarding the resonance and the transition may be found in FIG. 1 and the related descriptions thereof.

It should be noted that in some embodiments, the high-frequency jets emitted by the plurality of plasma generators 110 may also be superimposed in a flow direction. As illustrated in FIG. 5, the plurality of the plasma generators 110 distributed in a Z-direction may be superimposed in a flow direction V to increase an intensity of the high-frequency transverse waves.

In some embodiments of the present disclosure, by designing the output characteristics of the plurality of plasma generators 110, each of the plurality of plasma generators 110 may emit the high-frequency jets, a combination of the plurality of the plasma generators 110 may output a spatially distributed high-frequency transverse flow, thereby achieving forced transition of the boundary layer.

Figure 6:
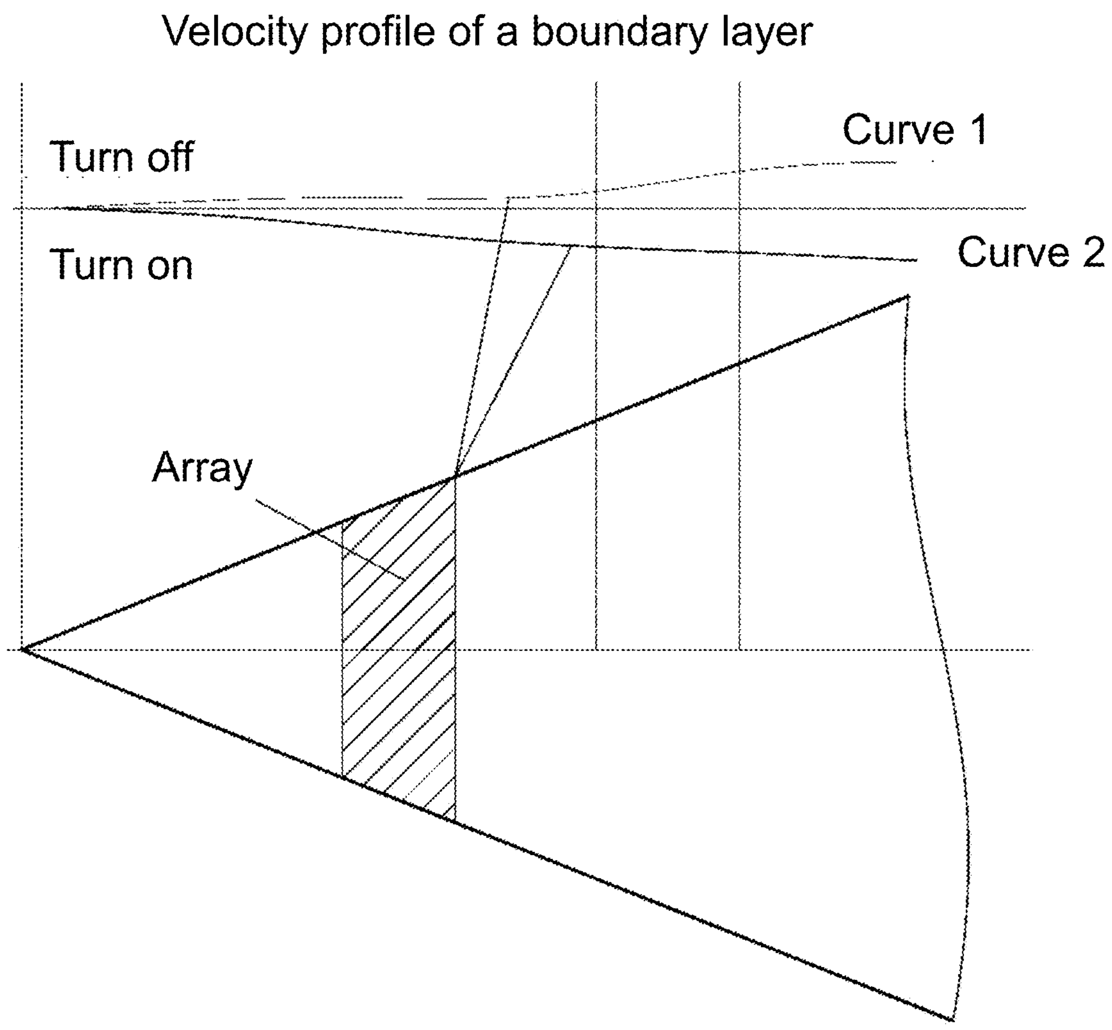
FIG. 6 is a schematic diagram illustrating a scenario of applying to a conical standard model according to some embodiments of the present disclosure.

FIG. 6 is a schematic diagram illustrating a scenario of applying to a conical target model according to some embodiments of the present disclosure. In a velocity profile of a boundary layer illustrated in FIG. 6, a curve 1 illustrates a velocity of fluid in the boundary layer after the transverse wave excitation plasma array generator 10 is turned off, and a curve 2 illustrates a velocity of the fluid in the boundary layer after the transverse wave excitation plasma array generator 10 is turned on. That is, the transverse wave excitation plasma array generator 10 may generate high-frequency transverse waves in an opposite direction of a high-velocity incoming flow to transition the fluid in the boundary layer into a turbulent flow, resulting in a decrease in a fluid velocity.

It should be noted that the transverse wave excitation plasma array generator 10 in some embodiments of the present disclosure is particularly suitable for controlling boundary layer flowing in a hypersonic inlet, separated flowing on a high-speed wing surface, shockwave control in a compression corner, or the like. As an example of controlling boundary layer flowing in the hypersonic inlet illustrated in FIG. 6, the transverse wave excitation plasma array generator 10 may be arranged in an inlet channel, so that periodic reverse jet generated by the transverse wave excitation plasma array generator 10 may interact with the high-velocity incoming flow. The interaction may enhance mixing of the boundary layer/mainstream, causing the incoming fluid of the air inlet to transition to the turbulent flow, and effectively suppressing flow separation in the compression corner and a reflection zone of lip shockwaves, thereby improving the performance of the air inlet.

In some embodiments, the plurality of the plasma generators 110 may be connected with a capacitor and an inductor to form an inductance-capacitance resonance circuit. The inductance-capacitance resonance circuit may be set at a predetermined loop position.

In some embodiments, the inductance-capacitance resonance circuit may be configured to drive the plurality of the plasma generators 110 to operate, modulating output characteristics of the plurality of the plasma generators 110. For example, the inductance-capacitance resonance circuit may control the plurality of plasma generators 110 to output corresponding high-frequency jets through charging and discharging of the capacitor and the inductor.

The predetermined loop position refers to a position of a loop under an excitation by high-frequency electricity. In some embodiments, the predetermined loop position may be set according to a demand of transition. For example, a large number of the plasma generators 110 are required, the plurality of the plasma generators 110 may be set to be separately located on a loop array, so that the plurality of the plasma generators 110 may generate the high-frequency jets with the same or similar voltage under a same voltage excitation.

In the embodiments of the present disclosure, by setting the inductance-capacitance resonance circuit to drive the plurality of plasma generators 110, each of the plurality of plasma generators 110 may output the corresponding high-frequency jets, and the plurality of the plasma generators 110 may generate a corresponding high-frequency transverse flow, thereby realizing frequency modulation and intensity adjustment of the high-frequency transverse flow in the flow direction, and broadening the boundary of flow control.

In some embodiments, one or more gas pressure sensors may also be provided within a predetermined range where the boundary layer of the controlled profile 200 is located.

In some embodiments, the one or more gas pressure sensors may be configured to detect a gas pressure of the boundary layer of the controlled profile 200. The gas pressure may reflect a flow state of the fluid. For example, the lower the gas pressure, the more likely the flow state of the fluid is a laminar flow state. In some embodiments, the predetermined range may be set based on control requirements of the controlled profile 200. For example, when the flow state of the fluid within a pipeline is required to be controlled, the one or more gas pressure sensors may be set at a circumferential wall of the pipeline.

In some embodiments, the one or more gas pressure sensors may detect a fluid pressure of the boundary layer to obtain a gas pressure sequence of the boundary layer. The gas pressure sequence may be a combination of a time point and the fluid pressure.

In some embodiments, the gas pressure sequence may be in various forms, such as an average of gas pressures obtained by the one or more gas pressure sensors, or the gas pressure sequence obtained by the one or more gas pressure sensors, or a gas pressure characteristic sequence of the one or more gas pressure sensors. The gas pressure characteristic sequence may include an absolute value of pressures detected by the one or more gas pressure sensors, a change rate, a distribution uniformity, a change stability, or the like. The absolute value of the pressures refers to a value of a pressure applied by a gas to the one or more gas pressure sensors as detected by the one or more gas pressure sensors at a time point.

In some embodiments, the gas pressure sequence may reflect an actual gas flow characteristic, such as a laminar flow characteristic, a turbulent flow characteristic, a flow around characteristic, or the like. The flow around characteristic may be reflected in a way that the fluid forms a rotating flow region around an object. More descriptions regarding the laminar and turbulent flow characteristics may be found in FIG. 1 and the related descriptions thereof.

In some embodiments, a count and an arrangement of the one or more gas pressure sensors may be related to a type of transition and a demand degree of transition of the boundary layer.

In some embodiments, the arrangement may include one or more arrangements such as a flat distribution, a vertical distribution, or the like. For example, the one or more gas pressure sensors may be distributed vertically on the boundary layer to gas pressures at different heights of the boundary layer.

The type of transition refers to a type of range of fluid transition. In some embodiments, the type of transition may include one or more types such as local transition, full transition, or the like.

In some embodiments, the demand degree of transition reflects a degree to which the fluid transition is required. For example, the more the gases requiring the fluid transition as for the demand degree of transition, the more the finer gas flow characteristic data required. Accordingly, a relatively large number of gas pressure sensors may be provided. As another example, if the demand degree of transition is low, a relatively small number of the gas pressure sensors may be provided near the attachment layer, thereby saving cost while satisfying the demand of transition.

In some embodiments, the plasma array controller 100 may obtain the type of transition and the demand degree of transition of the boundary layer through various ways, such as manual input, historical transition data, or the like.

In some embodiments, the type of transition and the demand degree of transition of the boundary layer may affect the count and the arrangement of the one or more gas pressure sensors. For example, if the demand degree of transition is low, a relatively small number of the gas pressure sensors may be provided near the boundary layer to reduce resources consumed for transition detection. As another example, if the demand degree of transition is high, the fluid may be mostly required to be converted from the laminar flow to turbulent flow, and a relatively large number of gas pressure sensors may be provided to obtain more and finer gas flow characteristic data.

In some embodiments, the plasma array controller 100 may determine the count and the arrangement of the corresponding gas pressure sensors using a gas pressure sensor array database based on the type of transition and the demand degree of transition of the boundary layer.

In some embodiments, the gas pressure sensor array database may be determined based on experimental data. For example, the plasma array controller 100 may establish the gas pressure sensor array database by recording a count and an arrangement pattern of different gas pressure sensors corresponding to different levels of transition by cumulatively calculating geometric mean points over a number of experiments (e.g., 20 times), thereby creating the gas pressure sensor array database.

The level of transition level may be related to the type of transition and the demand degree of transition. For example, the plasma array controller 100 may rank the transition based on the type of transition and the demand degree of transition. For example, the closer the type of transition is to the full transition and the demand degree of transition is in a relatively high predetermined demand range, the transition may be classified as level 1.

Correspondingly, the plasma array controller 100 may perform experiments (e.g., 10 experiments, etc.) with a same level (e.g., level 1) of transition in the database, and geometrically average (e.g., Euclidean averaging) corresponding arrangement patterns of the one or more gas pressure sensors, to obtain the arrangement and the count of the one or more gas pressure sensors corresponding to transition with level 1.

In the embodiments of the present disclosure, by setting the count and the arrangement of the one or more gas pressure sensors, the detected gas pressure may be more accurate, making it easier to control subsequent transition.

Figure 7:
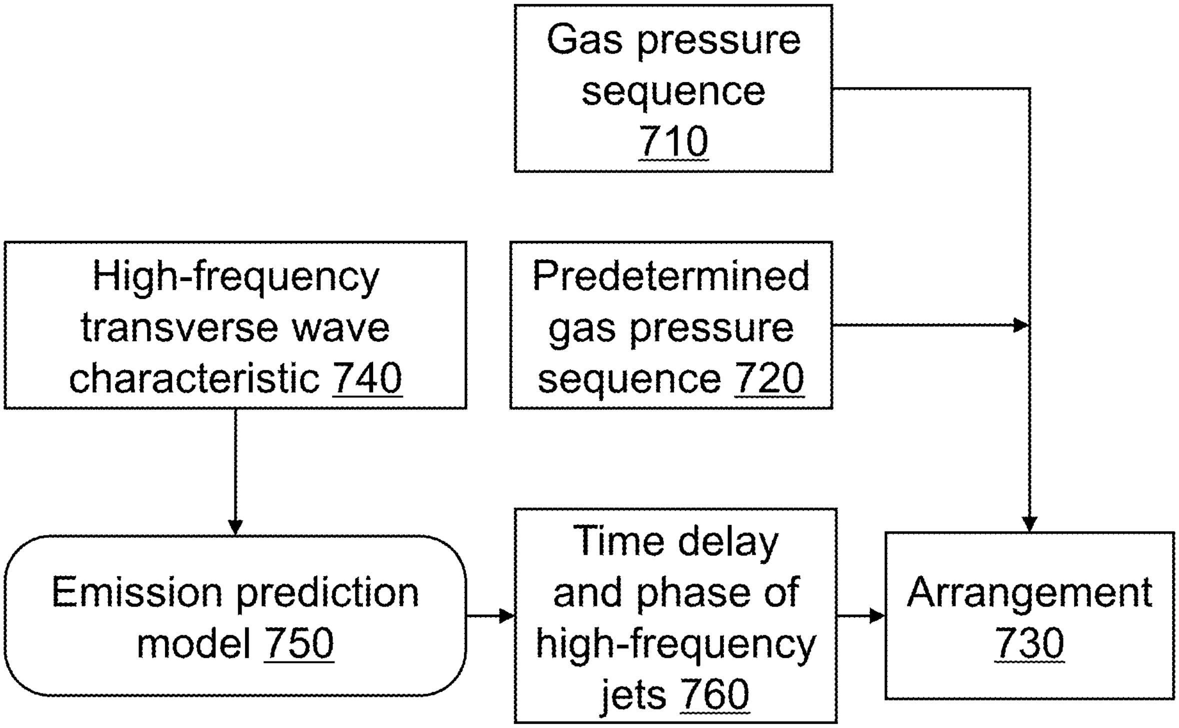
FIG. 7 is a schematic diagram illustrating a process of determining an arrangement of a plurality of plasma generators according to some embodiments of the present disclosure.

In some embodiments, as illustrated in FIG. 7, the plasma array controller 100 may obtain a gas pressure sequence 710 detected by one or more gas pressure sensors, and determine, based on a distance between the gas pressure sequence 710 and a predetermined gas pressure sequence 720, an emission parameter of the plurality of plasma generators 110. The emission parameter includes an arrangement 730 of the plurality of plasma generators 110.

The predetermined gas pressure sequence 720 refers to the required gas pressure sequence 710 for reflecting a predetermined gas flow characteristic. In some embodiments, the predetermined gas pressure sequence 720 may also be expressed as a predetermined gas pressure characteristic sequence.

In some embodiments, the predetermined gas pressure sequence 720 may be set based on manual experience or the demand of transition. For example, similar transition state data of the boundary layer may be found in historical transition control data based on a required demand of transition, and the historical gas pressure sequence 710 in the corresponding historical transition control data may be used as the current predetermined gas pressure sequence 720.

In some embodiments, the distance between the gas pressure sequence 710 and the predetermined gas pressure sequence 720 may be a Euclidean distance. The Euclidean distance reflects a similarity between the gas pressure sequence 710 and the predetermined gas pressure sequence 720. The larger the Euclidean distance, the lower the similarity, which indicates that the current arrangement 730 of the plurality of plasma generators 110 may have difficulty generating the predetermined gas flow characteristic, and more modifications may be needed for the current arrangement 730.

In some embodiments, the emission parameter refers to configuration parameter information that controls the plurality of plasma generators 110 to perform an emission. In some embodiments, the plasma array controller 100 may send the emission parameter to prompt information of a terminal device to prompt a user to modify the arrangement 730 of the plurality of plasma generators 110. In some embodiments, the plasma array controller 100 may control the plurality of plasma generators 110 based on the emission parameter to drive the plurality of plasma generators 110 to emit corresponding high-frequency jets. In some embodiments, the emission parameter may include the arrangement 730. The arrangement 730 may include one or more of an equally spaced arrangement, an uneven arranging, a circular arrangement, or the like.

In some embodiments, the plasma array controller 100 may determine the emission parameter of the plurality of plasma generators 110 based on a gas flow characteristic. Since the gas pressure characteristic sequence reflects the emission parameter, in some embodiments, in a database of the plasma array controller 100, different arrangements 730 may correspond to different predetermined gas pressure characteristic sequence for different flow scenarios. Correspondingly, in some embodiments, the plasma array controller 100 may select, based on the distance between the gas pressure sequence 710 and the predetermined gas pressure sequence 720, the arrangement 730 of the corresponding plasma generator 110. For example, the plasma array controller 100 may select the arrangement 730 corresponding to the predetermined gas pressure sequence 720 with the smallest distance between the gas pressure sequence 710 and the predetermined gas pressure sequence 720.

In some embodiments of the present disclosure, determining the emission parameter sent to the terminal device based on the distance between the gas pressure sequence 710 and the predetermined gas pressure sequence 720 may prompt the user to modify the arrangement 730 of the plurality of plasma generators 110 in time, thereby quickly and efficiently achieving the required predetermined gas pressure sequence 720.

In some embodiments, as illustrated in FIG. 7, the emission parameter may further include a time delay and a phase 760 of the high-frequency jets output from the plurality of plasma generators 110.

The time delay refers to a certain time delay set between different plasma generators 110. In some embodiments, the time delay may allow for stronger interaction of the generated high-frequency transverse waves, such as synthesis, superimposition, interference, or the like. In some embodiments, the plasma array controller 100 may control the time delay to superimpose a plurality of the high-frequency jets together in a specific manner, thereby achieving a stronger plasma flow control effect.

The phase refers to a certain phase difference set between different plasma generators 110. In some embodiments, the plasma array controller 100 may control a phase difference of the plurality of plasma array generators to adjust a propagation speed and a direction of plasma waves. For example, the phase control may be configured to adjust characteristic parameters such as an amplitude, a frequency, a phase, or the like, of the plasma waves.

In some embodiments, as illustrated in FIG. 7, the plasma array controller 100 may also predict, based on a predetermined high-frequency transverse wave characteristic 740, the time delay and the phase 760 of the high-frequency jets output from the plurality of plasma generators 110 through an emission prediction model 750, the emission prediction model 750 being a machine learning model; and determine the arrangement 730 of the plurality of plasma generators 110 based on the time delay and the phase 760 of the high-frequency jets.

In some embodiments, the emission prediction model 750 may be a machine learning model, such as a neural network model (NN), etc.

In some embodiments, an input of the emission prediction model 750 may include the high-frequency transverse wave characteristic 740. The high-frequency transverse wave characteristic 740 refers to a characteristic parameter of required high-frequency transverse waves. In some embodiments, the high-frequency transverse wave characteristic 740 may include characteristic parameters such as a wavelength, an amplitude, a frequency, a power spectrum, or the like. In some embodiments, the high-frequency transverse wave characteristic 740 may be determined by manual input or historical transition data, etc.

In some embodiments, an output of the emission prediction model 750 may include the time delay and the phase 760 of the high-frequency jets output from the plurality of plasma generators 110. In some embodiments, the time delay and the phase 760 of the high-frequency jets may be affected by the arrangement 730 of the plurality plasma array generators. Since the arrangement 730 of the plurality plasma array generators affects a propagation path and time of the high-frequency jets, which in turn affects a magnitude and a variation of the time delay and the phase, the arrangement 730 of the plurality of plasma array generators may be further determined based on the predicted time delay and the phase.

Merely by way of example, if the predicted phase difference and the predicted time delay values between different plasma generators are small, the equally spaced arrangement may be selected. If the calculated phase difference and the time delay values are large, the arrangement 730 may be adjusted to use another arrangement 730, such as a diagonal arrangement, a symmetrical arrangement, etc.

In some embodiments, the emission prediction model 750 may be trained based on a large amount of training data. The training data may include training samples and labels. For example, the training samples may include sample high-frequency transverse wave characteristics 740, and the labels of the training samples may include time delays and phase parameters controlled by the plasma array generators corresponding to the sample high-frequency transverse wave characteristics 740. The sample high-frequency transverse wave characteristics 740 may be historically generated high-frequency transverse wave characteristics satisfying requirements. In some embodiments, the plasma array controller 100 may obtain the high-frequency transverse wave characteristic 740 by detecting with a professional instrument, such as a spectrum analyzer, an oscilloscope, etc.

In some embodiment of the present disclosure, the plasma array controller 100 may consider information such as the required high-frequency transverse wave characteristic 740 when predicting the time delay and the phase 760 of the high-frequency jets and the arrangement 730 of the plurality of plasma generators 110, which makes the predicted time delay and the phase 760 and the arrangement 730 more realistic and improve the accuracy of transition. Meanwhile, the prediction efficiency may be improved using the machine learning model for prediction, thereby improving the timeliness of transition control.

The above description is made with respect to specific embodiments of the present disclosure. Other embodiments are within the scope of the appended claims. In some embodiments, the actions or steps recorded in the claims may be performed in a different order than in the embodiments and still achieve the desired results. In addition, the processes depicted in the accompanying drawings do not necessarily require a specific or sequential order as illustrated to achieve the desired results. In some embodiments, multitasking and parallel processing are also possible or may be advantageous.

In the 1930s, improvements to a technology could clearly distinguish between hardware improvements (e.g., improvements to circuit structures such as diodes, transistors, switches, etc.) and software improvements (improvements to method processes). However, as technology has evolved, many of today's method flow improvements can now be seen as direct improvements to hardware circuit structures. Designers almost always obtain the corresponding hardware circuit structure by programming the improved method flow into the hardware circuit. Therefore, it cannot be said that an improvement in a method flow cannot be realized with a hardware entity module. For example, a programmable logic device (PLD) (e.g., a field programmable gate array (FPGA)) is one such integrated circuit whose logical function is determined by user programming of the device, which is programmed by the designer to "integrate" a digital system on a PLD, without the need to ask the chip manufacturer to design and produce a dedicated IC chip. In addition, nowadays, instead of manually producing integrated circuit chips, this programming is often done using "logic compilers" software, which is similar to the software compiler used during program development. Furthermore, the compilation of the original code before it is also done using a specific programming language, referred to as a Hardware Description Language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, Ruby Hardware Description Language (RHDL). Very-High-Speed Integrated Circuit Hardware Description Language (VHDL) and Verilog are the most commonly used today. It should also be clear to those skilled in the art that a hardware circuit implementing the logical method flow can easily be obtained by simply programming the method flow into an integrated circuit with a little bit of logic programming in one of the above-mentioned hardware description languages.

The controller may be implemented in any suitable manner. For example, the controller may take the form of a computer chip or entity, or a processor and storage media containing computer-readable program code that can be executed by the processor, such as software or firmware, or logical gates, switches, Application Specific Integrated Circuit (ASIC), programmable logic controllers, and embedded microcontrollers. Examples of controllers include but are not limited to microcontrollers such as ARC 625D, Atmel AT91SAM, Microchip PIC18F26K20, and Silicone Labs C8051F320, where the storage controller may also be implemented as part of the control logic of the memory. Those skilled in the art also know that in addition to being implemented in a pure computer-readable program code manner, it is also possible to implement a controller that realizes the method by programming the steps of the method into a logic gate, switch, dedicated integrated circuit, programmable logic controller, and embedded microcontroller. Accordingly, such a controller can be considered a hardware component, and structures within it that are used to implement various functions can be viewed as structures within a hardware component. Or even, the devices used to implement the various functions can be considered as both a software module that implements the method and a structure within the hardware component.

The systems, apparatuses, modules, or units elucidated in the above embodiments may specifically be realized by a computer chip or entity, or by a product having a certain function. One exemplary implementation device is a computer. Specifically, the computer may be, for example, a personal computer, a laptop computer, a cellular telephone, a camera phone, a smart phone, a personal digital assistant, a media player, a navigation device, an email device, a game console, a tablet computer, a wearable device, or any combination thereof.

For the convenience of description, the above devices are described in terms of functions divided into various units separately. Of course, it is possible to realize the functions of the various units in the same or more than one software and/or hardware when implementing the embodiments of the present disclosure.

Those skilled in the art should understand that one or more embodiments of the present disclosure may be provided as a method, system, or computer program product. Accordingly, the one or more embodiments of the present disclosure may be in the form of a fully hardware embodiment, a fully software embodiment, or an embodiment that combines software and hardware aspects. Furthermore, the present disclosure may take the form of a computer-usable storage medium (including, but not limited to, disk memory, CD-ROM, optical memory, or the like) on which one or more computer-usable program code is contained in the form of a computer program product.

The present disclosure is described with reference to flowcharts and/or block diagrams of methods, apparatus (systems), and computer program products according to the embodiments of the present disclosure. It should be understood that a combination of each of the processes and/or boxes in the flowchart and/or block diagrams, as well as the processes and/or boxes in the flowchart and/or block diagrams, may be implemented by computer program instructions. These computer program instructions may be provided to a processor of a general-purpose computer, a special-purpose computer, an embedded processor, or other programmable data-processing device to produce a machine, such that the instructions executed by the computer or other programmable data-processing device's processor executes the instructions to produce a machine for implementing a function specified in one or more processes of a flowchart and/or one or more boxes of a block diagram.

These computer program instructions may also be stored in a computer-readable memory capable of directing a computer or other programmable data processing device to operate in a particular manner, such that the instructions stored in the computer-readable memory produce an article of manufacture comprising an instruction device that implements a function specified in one or more processes of a flowchart and/or one or more boxes of a block diagram.

These computer program instructions may also be loaded onto a computer or other programmable data-processing device, such that a series of operational steps are performed on the computer or other programmable device to produce computer-implemented processing, such that the computer or other programmable device provides steps for implementing a function specified in one or more processes of a flowchart and/or one or more boxes of a block diagram.

In a typical configuration, a computing device includes one or more processors (CPUs), input/output interfaces, network interfaces, and memory.

The memory may include forms of non-permanent memory, random-access memory (RAM), and/or non-volatile memory in computer-readable media, such as read-only memory (ROM) or flash memory (flash RAM). The memory is an example of computer-readable media.

The computer-readable media, including permanent and non-permanent, removable and non-removable media, may be used by any method or technique to implement information storage. Information may be computer-readable instructions, data structures, program modules, or other data. Examples of storage media for computers include, but are not limited to, phase-change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, read-only CD-ROM, digital versatile discs (DVDs), or other optical storage, magnetic cartridge tapes, magnetic tape magnetic disk storage, or other magnetic storage devices, or any other non-transfer media that can be used to store information that can be accessed by a computing device. The computer-readable media, as defined herein, do not include transient computer-readable media (transitory media), such as modulated data signals and carriers.

One or more embodiments of the present disclosure may be described in the general context of computer-executable instructions executed by a computer, such as a program module. In general, program modules include routines, programs, objects, components, data structures, or the like that perform particular tasks or implement particular abstract data types. One or more embodiments of the present disclosure may also be practiced in distributed computing environments in which tasks are performed by remote processing devices that are connected via a communication network. In distributed computing environments, program modules may be located in local and remote computer storage media including storage devices.

Each of the embodiments in the present disclosure is described in a recursive manner, and it is sufficient to refer to each other for identical and similar portions of each embodiment, with each embodiment focusing on differences from the other embodiments. In particular, for the system embodiments, the descriptions are simpler because they are basically similar to the method embodiments, and it is sufficient to refer to the part of the method embodiments for the relevant description.

The basic concept has been described above. Obviously, for those skilled in the art, the above detailed disclosure is only an example, and does not constitute a limitation to the present disclosure. Although not expressly stated here, those skilled in the art may make various modifications, improvements and corrections to the present disclosure. Such modifications, improvements and corrections are suggested in this disclosure, so such modifications, improvements and corrections still belong to the spirit and scope of the exemplary embodiments of the present disclosure.

Meanwhile, the present disclosure uses specific words to describe the embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, certain features, structures, or characteristics in one or more embodiments of the present disclosure may be properly combined.

In addition, unless clearly stated in the claims, the sequence of processing elements and sequences described in the present disclosure, the use of counts and letters, or the use of other names are not used to limit the sequence of processes and methods in the present disclosure. While the foregoing disclosure has discussed by way of various examples some embodiments of the invention that are presently believed to be useful, it should be understood that such detail is for illustrative purposes only and that the appended claims are not limited to the disclosed embodiments, but rather, the claims are intended to cover all modifications and equivalent combinations that fall within the spirit and scope of the embodiments of the present disclosure. For example, although the implementation of various components described above may be embodied in a hardware device, it may also be implemented as a software only solution, e.g., an installation on an existing server or mobile device.

In the same way, it should be noted that in order to simplify the expression disclosed in this disclosure and help the understanding of one or more embodiments of the invention, in the foregoing description of the embodiments of the present disclosure, sometimes multiple features are combined into one embodiment, drawings or descriptions thereof. This method of disclosure does not, however, imply that the subject matter of the disclosure requires more features than are recited in the claims. Rather, claimed subject matter may lie in less than all features of a single foregoing disclosed embodiment.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of +20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A transverse wave excitation plasma array generator, comprising a plasma array controller and a controlled profile, wherein the plasma array controller includes a plurality of plasma generators, the plasma array controller refers to an electronic device that performs transition control, the plasma array controller is mounted on the controlled profile, and a transition refers to a process of a fluid transitioning from a laminar flow state to a turbulent flow state;

the plasma array controller is configured to:

control the plurality of plasma generators to inject an energy into atoms and molecules and convert the atoms and the molecules into ions to generate high-frequency jets under an excitation of high-frequency electricity, wherein a frequency of the high-frequency electricity is within a range of 1 kHz-3 kHz, a voltage of the high-frequency electricity is within a range of 1 kV-10 kV, and a frequency of the high-frequency jets is within a range of 1 kHz-3 kHz, obtain spatially distributed high-frequency transverse waves, and generate high-frequency excitation for controlling a second mode of a boundary layer of the controlled profile to promote the transition of the boundary layer of the controlled profile; wherein the plurality of the plasma generators are connected with a capacitor and an inductor to form an inductance-capacitance resonance circuit, the inductance- capacitance resonance circuit is set at a predetermined loop position, each of the plurality of plasma generators includes a cavity and electrodes disposed at two sides of the cavity, and the electrodes generate, based on the high-frequency electricity, the high-frequency jets; and the plasma array controller is configured as that the each of the plurality of plasma generators is connected in series with a plurality of capacitor units and a plurality of inductive coils to form a multi-level array loop; an input end of a lower array loop is connected with a downstream of an inductive coil of a higher array loop to form a loop module; and each loop module is connected in series with the next loop module to form a loop module group, and each loop module group is connected in parallel with the next loop module group to form the plasma array controller.

2. The transverse wave excitation plasma array generator of claim 1, wherein a material of the cavity includes a ceramic, and a material of the electrodes includes tungsten.

3. The transverse wave excitation plasma array generator of claim 1, wherein a ratio of a diameter of each of the electrodes to an inner diameter of the cavity is within a range of 0.05-0.08.

4. The transverse wave excitation plasma array generator of claim 1, wherein a ratio of a spacing of the plurality of plasma generators in an X-direction to a spacing of the plurality of plasma generators in a Z-direction is within a range of 0.8-1.2.

5. The transverse wave excitation plasma array generator of claim 4, wherein a ratio of a count of the plurality of plasma generators distributed in the X-direction to a count of the plurality of plasma generators distributed in the Z-direction is within a range of 0.8-1.2.

6. The transverse wave excitation plasma array generator of claim 1, wherein output characteristics of the plurality of plasma generators satisfy a predetermined output relationship expressed as:

$$Y=F(\omega,t,\tau,\varphi)$$

wherein Y denotes the output characteristics of the plurality of plasma generators, ω denotes a jet frequency of the plurality of plasma generators, t denotes a time sequence of the plurality of plasma generators generating the high-frequency jets, τ denotes a spatial distribution delay matrix of the transverse wave excitation plasma array generator, and o denotes a spatial distribution phase matrix of the transverse wave excitation plasma array generator.

7. The transverse wave excitation plasma array generator of claim 1, wherein one or more gas pressure sensors are provided within a predetermined range where the boundary layer of the controlled profile is located, and the plasma array controller is further configured to:

obtain a gas pressure sequence detected by the one or more gas pressure sensors, and determine, based on a distance between the gas pressure sequence and a predetermined gas pressure sequence, an emission parameter of the plurality of plasma generators, the emission parameter including an arrangement of the plurality of plasma generators.

8. The transverse wave excitation plasma array generator of claim 7, wherein the emission parameter further includes a time delay and a phase of the high-frequency jets output from the plurality of plasma generators, and the plasma array controller is further configured to:

predict, based on a predetermined high-frequency transverse wave characteristic, the time delay and the phase of the high-frequency jets output from the plurality of plasma generators through an emission prediction model, the emission prediction model being a machine learning model; and determine the arrangement of the plurality of plasma generators based on the time delay and the phase of the high-frequency jets.

9. The transverse wave excitation plasma array generator of claim 7, wherein a count and an arrangement of the one or more gas pressure sensors are related to a type of transition and a demand degree of transition of the boundary layer.

10. The transverse wave excitation plasma array generator of claim 8, wherein the time delay refers to a certain time delay set between the plurality of plasma generators, and the plasma array controller is configured to control the time delay to superimpose a plurality of the high-frequency jets together in a specific manner.

11. The transverse wave excitation plasma array generator of claim 9, wherein the plasma array controller is further configured to:

in response to determining that the demand degree of transition is low, provide a relatively small count of the gas pressure sensors near the boundary layer.

12. The transverse wave excitation plasma array generator of claim 1, wherein the second mode refers to an inherent vibration characteristic of the boundary layer with a predetermined inherent frequency, the predetermined inherent frequency is determined based on a parameter and a morphology of the boundary layer, and the boundary layer refers to a fluid boundary layer that attaches to surface of a solid when the fluid flows along the surface of the solid or when the solid moves in the fluid.

13. The transverse wave excitation plasma array generator of claim 1, wherein in the series connection of a plurality of loop modules, an input end of an inductive coil in a first array loop of the next loop module is connected with an output end of a plasma generator of a previous loop module to form the loop module group.

14. The transverse wave excitation plasma array generator of claim 1, wherein in the parallel connection of a plurality of loop module groups, input ends of a plurality of inductive coils in a first array loop of each of the plurality of loop module groups are connected, and output ends of a plurality of plasma generators in a last array loop of the each of the plurality of loop module groups are connected, and the connected input ends and the connected output ends receive the excitation of the high-frequency electricity, respectively, to form the plasma array controller.

15. The transverse wave excitation plasma array generator of claim 1, wherein the cavity is provided with through holes to allow the ions to be ejected from the cavity to generate the high-frequency jets.

16. The transverse wave excitation plasma array generator of claim 1, wherein the predetermined loop position refers to a position of a loop under the excitation by the high-frequency electricity, and when a large number of plasma generators are required, the plurality of the plasma generators are set to be separately located on a loop array.

* * * * *